US 6,705,307 B2

(12) United States Patent  (10) Patent No.: US 6,705,307 B2
Alden et al.  (45) Date of Patent: Mar. 16, 2004

(54) REMOVABLE GAS BURNER UNIT FOR BARBECUE GRILL

(75) Inventors: J. Michael Alden, Palatine, IL (US); Leonard G. Zelek, Chicago, IL (US); James C. Stephen, Arlington Heights, IL (US)

(73) Assignee: Weber-Stephens Product Co., Palatine, IL (US)

( * ) Notice: Subject to any disclaimer, the term of this patent is extended or adjusted under 35 U.S.C. 154(b) by 0 days.

(21) Appl. No.: 10/146,470

(22) Filed: May 15, 2002

(65) Prior Publication Data

US 2003/0213484 A1 Nov. 20, 2003

(51) Int. Cl.[7] .................................. F24C 3/02
(52) U.S. Cl. ....................... 126/41 R; 126/9 B; 431/154
(58) Field of Search ................. 126/41 R, 26, 126/9 B; 431/154

(56) References Cited

U.S. PATENT DOCUMENTS

| 2,122,275 A | 6/1938 | Bitney |
| 2,541,528 A | 2/1951 | McAvoy |
| 2,920,614 A | 1/1960 | Phelps |
| 2,946,275 A | 7/1960 | Compton |
| 3,209,743 A | 10/1965 | Stewart et al. |
| 3,279,452 A | 10/1966 | Hottenroth et al. |
| 3,330,266 A | 7/1967 | Stephen |
| 3,688,757 A | 9/1972 | Dusek |
| 3,794,013 A | 2/1974 | Upton |
| 3,802,413 A | 4/1974 | Pepin |
| 3,913,557 A | 10/1975 | Ewanika et al. |
| 3,938,494 A | 2/1976 | Clark |
| 4,362,093 A | 12/1982 | Griscom |
| 4,416,249 A | 11/1983 | Reynolds et al. |
| 4,677,964 A | 7/1987 | Lohmeyer et al. |
| 4,706,643 A | 11/1987 | Tyson |
| 4,819,614 A | 4/1989 | Hitch |
| 4,899,725 A | 2/1990 | Barron, Jr. |
| 5,032,183 A | 7/1991 | Frazier |
| 5,070,857 A | 12/1991 | Sarten |
| 5,097,817 A | 3/1992 | Dodgen |
| 5,186,159 A | 2/1993 | Crow, Jr. et al. |
| 5,213,027 A | 5/1993 | Tsotsos et al. |
| 5,293,859 A | 3/1994 | Lisker |
| 5,460,159 A | 10/1995 | Bussey |
| 5,934,183 A | 8/1999 | Schlosser et al. |
| 5,988,158 A | 11/1999 | Schmidt, Jr. |
| 6,000,389 A | 12/1999 | Alpert |
| 6,050,177 A | 4/2000 | Lassig, Jr. |
| 6,102,029 A | 8/2000 | Stephen et al. |

Primary Examiner—Alfred Basichas
(74) Attorney, Agent, or Firm—Wallenstein Wagner & Rockey, Ltd.

(57) ABSTRACT

A removable burner assembly is provided for a gas barbecue grill. The removable burner assembly has a burner frame having an open bottom and an open top, a burner connected to the burner frame, and a manifold in fluid communication with the burner. The burner frame, with the connected burner, is adapted to be removably mounted as a self-contained subassembly in the housing of the grill.

38 Claims, 11 Drawing Sheets

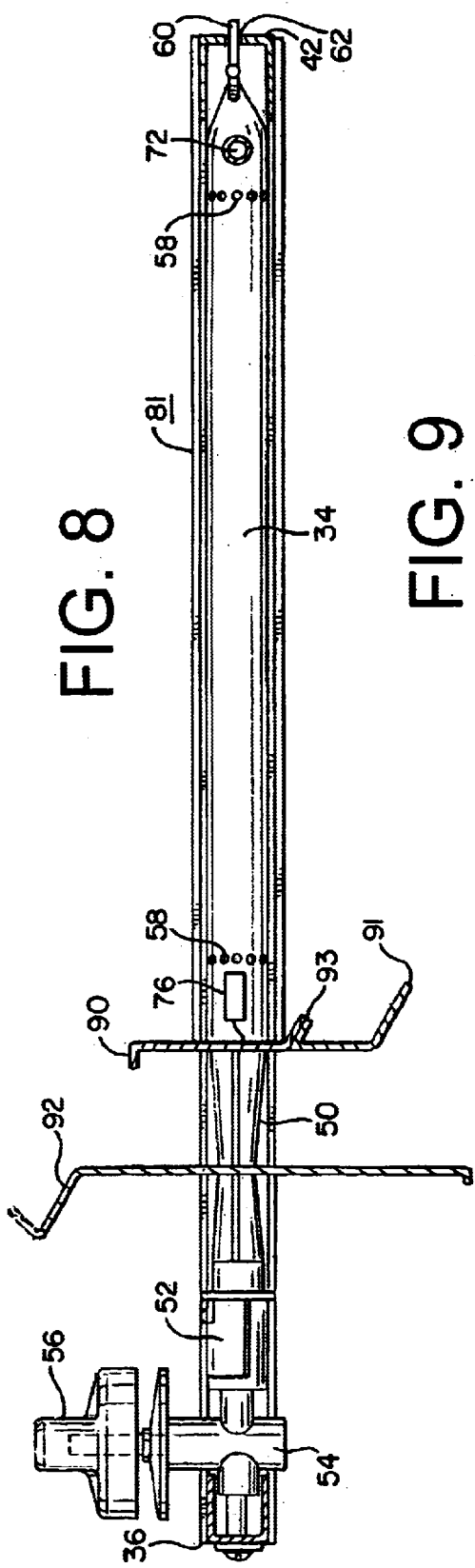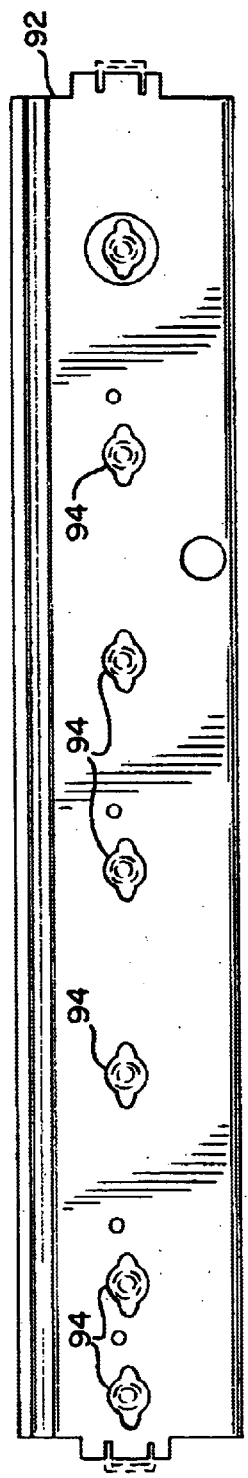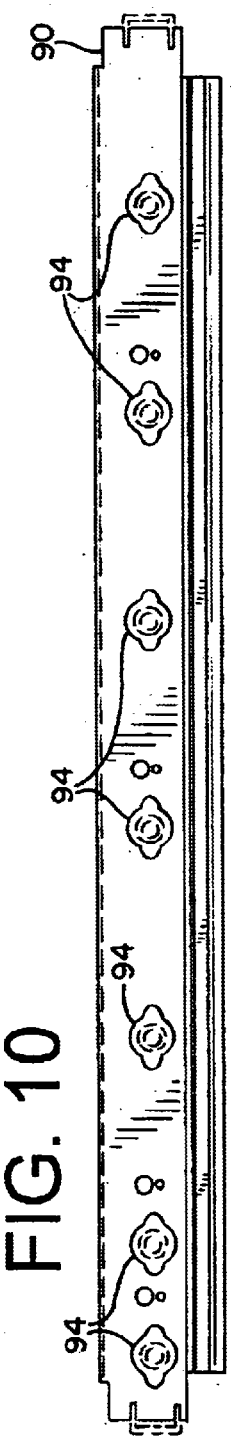

REMOVABLE GAS BURNER UNIT FOR BARBECUE GRILL

TECHNICAL FIELD

The present invention relates generally to removable gas burner units, and more specifically to gas barbecue grills and other gas cooking devices having removable gas burner units and methods of assembling and repairing such removable gas burner units in cooking devices.

BACKGROUND OF THE INVENTION

Gas cooking devices, including gas barbecue grills, are very widely used today. Typically, gas cooking devices utilize natural gas or liquid petroleum gas as fuel. With respect to outdoor gas cooking devices, most of such devices generally include a cart or support frame, often with wheels, that supports a firebox or cooking chamber. The cooking chamber usually has a lower portion and a hinged upper portion or cover. One or more gas burners are located inside the lower portion of the cooking chamber, and a cooking grid is positioned above the burners. Further, a heat-transferring material or object is generally located between the gas burners and the cooking grid. In the past, the heat-transfer material was comprised of lava rock. The assignee of the present invention, however, developed a gas grill employing conductive sear bars which eliminate the need for lava rock. Such a grill is disclosed in U.S. Pat. No. 4,677,964. Finally, a fuel supply provides the burners with the fuel for burning. Typically, the fuel supply is a portable fuel tank which is supported on the support frame.

Generally, burners for gas cooking devices are separately fixed in place. As described in the '964 patent at column 6, lines 52–68, and as illustrated in FIG. 8 of the '964 patent, during assembly of the grill each of the burners are separately inserted into the grill and fixedly fastened to the grill with a threaded fastener. Fastening of the burners to the grill not only increases the complexity and duration of assembly, but it also makes disassembly and cleanup of the grill components more difficult and time consuming. Nevertheless, several cooking devices employing removable cooking means have been developed.

In an effort to provide cooking of food in two different modes, the inventors of U.S. Pat. No. 4,819,614, assigned to W.C. Bradley Company, developed a grill that may be used as an electric or gas-fired unit, with a suitable burner element, and which may also be used as a charcoal grill. In an effort to serve this purpose, the '614 patent discloses a removable tray having a plurality of semi-circular channels. The two surfaces of the semi-circular channels operate as a top and bottom of the removable tray. Because the tray is reversible, the tray serves as a combination charcoal receiving and retaining means, and as a heat radiant means. As shown in FIG. 3 of the '614 patent, a gas burner or electric heating element is fixedly mounted to the grill near the bottom of the firebox. In the charcoal mode, the semi-circular channels are positioned in the upper-facing concave position and are filled with charcoal, and the gas burner is fixedly mounted to the grill below the removable tray to ignite the charcoal. In the gas mode, the tray is removed from the grill and inserted back is the grill in an inverted or position (i.e., reversible). As such, the channels have an upper-facing convex surface which is used to shield the burner and incinerate substantially all of the grease and other liquids dripping from the food being cooked on the above cooking grid. While the charcoal holding tray of the '614 patent is removable from the grill, the gas and electric burners are not removable as they are not part of the tray, but rather the gas and electric burners are fixed to the grill.

A removable cooking grid design is found in U.S. Pat. No. 5,213,027, assigned to The Alexander Oven Co., Inc. The '027 patent generally discloses a barbecue grill with a removable cooking grid positioned above a fixed primary heat source. A frame is used for supporting the cooking grid. Further, a drawer element is connected to and supports the frame of the cooking grid for rollably withdrawing the cooking grid from the main chamber. With the use of sliding elements, the cooking grid may be both elevated or lowered to adjust cooking speed of food atop the cooking grid. Additionally, the cooking grid may be withdrawn from over the main heat source to examine cooking progress or to remove food. The gas fueled heat source, however, is fixedly positioned in the lower portion of the main cooking chamber, and is maintained separate from the removable cooking grid.

Another cooking apparatus with a removable burner is found in U.S. Pat. No. 3,938,494, assigned to Guaranteed Weather, Inc. The '494 patent discloses a cooking apparatus adapted for multi-purpose use as a grill, oven, stove or patio heater. The cooking apparatus comprises a lower housing with an open bottom and a hinged cover. Multiple cooking grids are positioned in the lower housing, and the housing has a door to allow a user to access the lower of the cooking grids. Below the lowest cooking grid is a grate, also positioned in the lower housing. A single gas burner extends about the lengthwise portion of the chamber of the lower housing adjacent the open bottom, and can be regulated for cooking to produce a flame to heat lava rock positioned on top of the upper portion of the grate. The upper portion of the grate is "positioned about 2 inches above the burner." Two support bosses on the rear wall of the housing, and two support bosses on the front wall of the housing are located to support the grate at the desired elevation within the housing. The grate has a generally rectangular member with two intermediate longitudinal stringer wires. A series of short V-shaped formed wires are welded at their outer ends to the longitudinal member, and at their inner ends to the associated stringer. As such the grate is provided with a "gull wing configuration." Additionally, a U-shaped yoke having a lateral extension support bracket is welded to and dependent from the raised center portion of the grate to provide a cradle support for the valve end of the gas burner. The burner is similarly supported by drop center struts at the center portion and at the opposite end of the grate so that no additional supporting structure is required for the burner.

The burner of the '494 patent is readily removable from the lower section of the housing and from the burner grate by disconnecting the quick disconnect, then tilting the closed end of the burner upwardly while simultaneously moving the burner endwise to draw the burner valve through a key-hole shaped side port in the grill. The grate can then be separately removed by a different means. Finally, the burner and the grate can be placed directly in a home fireplace for winter use to provide a gas-fired fireplace burner.

A barbecue grill employing a lower grill burner enclosure is disclosed in U.S. Pat. No. 5,186,159. The '159 patent discloses a removable burner assembly that attaches to and below the lower portion of the grill housing. The lower portion of the grill housing has no bottom wall, however, the burner assembly has a closed bottom member that forms the bottom wall of the grill housing when the burner assembly is attached to the grill. The burner is attached to the burner assembly with a bracket fixedly connected to the bottom wall member of the burner assembly. The removable burner assembly attaches to the upper enclosure of the grill with the use of lip at the rear, and an L-shaped spring clip which engages and rests upon the front ledge of the upper enclosure.

U.S. Pat. No. 6,050,177 discloses a multi-fuel, fuel isolated cooker comprising a stainless steel box having side walls and a bottom, with a combustion chamber 13. The combustion chamber 13 is entirely enclosed and removable fuel drawer inserts may be inserted therein from the outside of the cooker. One fuel drawer insert, disclosed in FIG. 9, includes a gas burner assembly welded to the bottom of the fuel drawer.

U.S. Pat. No. 4,706,643 discloses a charcoal grill with an optional gas assembly. The gas assembly includes a burner with a pair of opposed flanges. The gas assembly can be inserted into a side of the grill and mounted by having the opposed flanges rest at the end of a tray slide. To ignite the burner assembly, it is partially removed from the grill and lit with a match. The lit burner is then inserted into the grill. In the charcoal mode a charcoal basket is provided with a charcoal clean out tray therebelow. The clean out tray may be inserted in the same opening as the gas burner when the gas burner is removed.

U.S. Pat. No. 3,802,413 discloses a camping stove having a sheet metal case comprising a rectangular box with a window in the front side of the box. A drawer like element mounting assembly is retained in position in the camping stove by means of a pair of channel members which are fixedly secured inside the sheet metal case. The channel members are adapted to slidably engage the sides of the mounting assembly. The drawer-like element mounting assembly has a closed top and bottom.

In view of the prior devices, a cooking apparatus with an improved removable burner assembly is desired.

SUMMARY OF THE INVENTION

The removable burner assembly of the present invention provides a burner assembly that can be inserted and removed from the grill as a unit for purposes of assembly, cleaning and replacement. Generally, the removable burner assembly comprises a burner frame, a burner and a manifold. The burner is connected to the burner frame and the manifold is in fluid communication with the burner. Further, the burner frame, with the connected burner, is adapted to be removably mounted in the housing of the grill. And, the removable burner assembly is adapted to be inserted and removed from the cooking chamber of the barbecue grill.

According to one aspect of the present invention, the burner frame, with the connected burner, slidingly engages the housing of the grill. In one embodiment the burner frame engages a ledge on the grill housing.

According to another aspect of the present invention, the burner frame has an open top and an open bottom. The open top and the open bottom assist in allowing grease and other droppings to fall from the cooking grate through the burner assembly.

According to another aspect of the present invention, the burner frame is defined by a perimeter of members of the burner frame. The burner frame has a first side member, an opposed second side member, and a transverse member. The transverse member connects the first and second side members. The first and second side members may define a perimeter of the burner frame, and the burner or the plurality of burners are located within the perimeter of the burner frame.

According to another aspect of the present invention, a front frame member of the burner frame is provided. The front frame member connects the first and second side members. Typically, the front frame member is located between the manifold and the rear member of the burner frame. In one embodiment, the front frame member is adapted to engage the housing of the grill when the burner assembly is fully seated in the grill.

According to another aspect of the present invention, the transverse member of the burner frame and the manifold each have a length, respectively. In one embodiment, the transverse member and the manifold are exchangeable with an extended rear member and an extended manifold, respectively, to increase the length of the burner frame of the removable burner assembly and to accommodate a greater number of burners for the burner assembly.

According to another aspect of the present invention, the burner frame has a first mating member adapted to mate with a second mating member of the barbecue grill to locate the burner frame within the cooking chamber of the barbecue grill. The mating members assist the burner assembly in being inserted and removed from the barbecue grill. In one embodiment, the second mating member is a portion of the grill housing, and the opposed side members of the burner frame are adapted to engage the second mating member to locate the burner frame within the cooking chamber of the barbecue grill.

According to another aspect of the present invention, a control valve is adjacent the manifold and the burner to control the flow of fuel from the manifold to the burner.

According to another aspect of the present invention, an ignitor is connected to the burner frame. The ignitor is located adjacent an outlet of the burner to ignite fuel being expelled from the openings in the burner.

According to another aspect of the present invention, the removable burner assembly may have a plurality of burners. In this embodiment the manifold is in fluid communication with the plurality of burners. Further, the manifold is adapted to be connected in fluid communication with the fuel supply of the barbecue grill.

According to another aspect of the present invention, one of the plurality of burners is a primary burner, and at least a different one of the plurality of burners is a secondary burner. Typically, a first control valve is located adjacent the primary burner, and a second control valve is located adjacent the secondary burner. The first and second control valves independently control the flow of fuel through the primary and secondary burners, respectively. Further, an ignitor is typically positioned adjacent the primary burner to ignite the fuel being expelled from the primary burner.

According to another aspect of the present invention, a flame cross-over member is provided between the primary burner of the plurality of burners and the secondary burner of the plurality of burners. The flame cross-over member provides ignition for fuel in the secondary burner after the fuel being expelled from the primary burner has been ignited.

According to another aspect of the present invention, the plurality of burners comprise a plurality of sets of burners. Each set of burners has a primary burner, a secondary burner, and a flame cross-over member fluidly connecting the primary burner and the secondary burner, and wherein each of the plurality of sets of burners are located within the boundary of the burner frame. An ignitor may be adjacent each primary burner to provide separate ignition of the fuel for each set of burners.

According to another aspect of the present invention, the plurality of burners further comprise an independent primary burner. The independent primary burner is located within the boundary of the burner frame and is adjacent one of the sets of burners. The independent primary burner may be utilized as a burner for a smoker assembly.

According to another aspect of the present invention, a removable burner assembly and barbecue grill are provided. The barbecue grill has a housing with a cooking chamber, and a support member depending from an interior of the housing. The housing further has a bottom wall, and a hood enclosing a top of the cooking chamber. Typically, the barbecue grill is supported by a support assembly. The removable gas burner assembly for the barbecue grill has a burner frame having an open top and an open bottom. A burner is connected to the burner frame, and a manifold is in fluid communication with the burner. The burner frame further has a mating portion removably engaging the support member to support the removable gas burner assembly within the housing of the barbecue grill.

According to another aspect of the present invention, the housing of the barbecue grill has an aperture through a wall thereof. The removable gas burner assembly is inserted into the barbecue grill housing through the aperture. Further, the removable gas burner assembly slidingly engages the support member of the housing through the aperture. In one embodiment, a portion of the burner frame assembly extends outside of the cooking chamber even when the burner frame assembly is fully seated in the barbecue grill.

According to another aspect of the present invention, methods of servicing a removable burner assembly are provided. One method includes identifying components of the burner assembly that require servicing. Another method includes removing the burner assembly as a unit from the barbecue grill. Another method includes cleaning the burner assembly. Another method includes repairing the burner assembly. Another method includes replacing components of the burner assembly.

According to yet another aspect of the present invention, another method of servicing a removable burner unit for a barbecue grill having a housing with an aperture in a wall thereof is provided. The method comprises the steps of identifying a burner assembly having an open top and an open bottom, the burner assembly comprising a burner frame defined by opposed first and second side members and a transverse member connecting the first and second side members, a plurality of burners connected to the burner frame, a manifold in fluid communication with the burners, a flame cross-over member connecting at least two of the plurality of burners in fluid communication, the flame cross-over member being distal the manifold and within a boundary of the burner frame, an ignitor adjacent one of the plurality of burners, and a gas line extending from the manifold to a connector fluidly connected to a fuel supply; disconnecting the gas line from the connector; removing the burner assembly from the grill by sliding the burner assembly out the aperture in the grill housing; servicing the burner assembly; and, mounting the burner assembly back in the grill by sliding the burner assembly at least partially into the grill housing through the aperture in the grill housing.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 8 is a side elevation view of the removable burner assembly of the present invention about lines 8—8 of FIG. 6;

FIG. 9 is a front elevation view of a transverse member of the removable burner assembly of FIG. 6;

FIG. 10 is a front elevation view of another transverse member of the removable burner assembly of FIG. 6;

DETAILED DESCRIPTION OF THE PREFERRED EMBODIMENT

Figure 1:
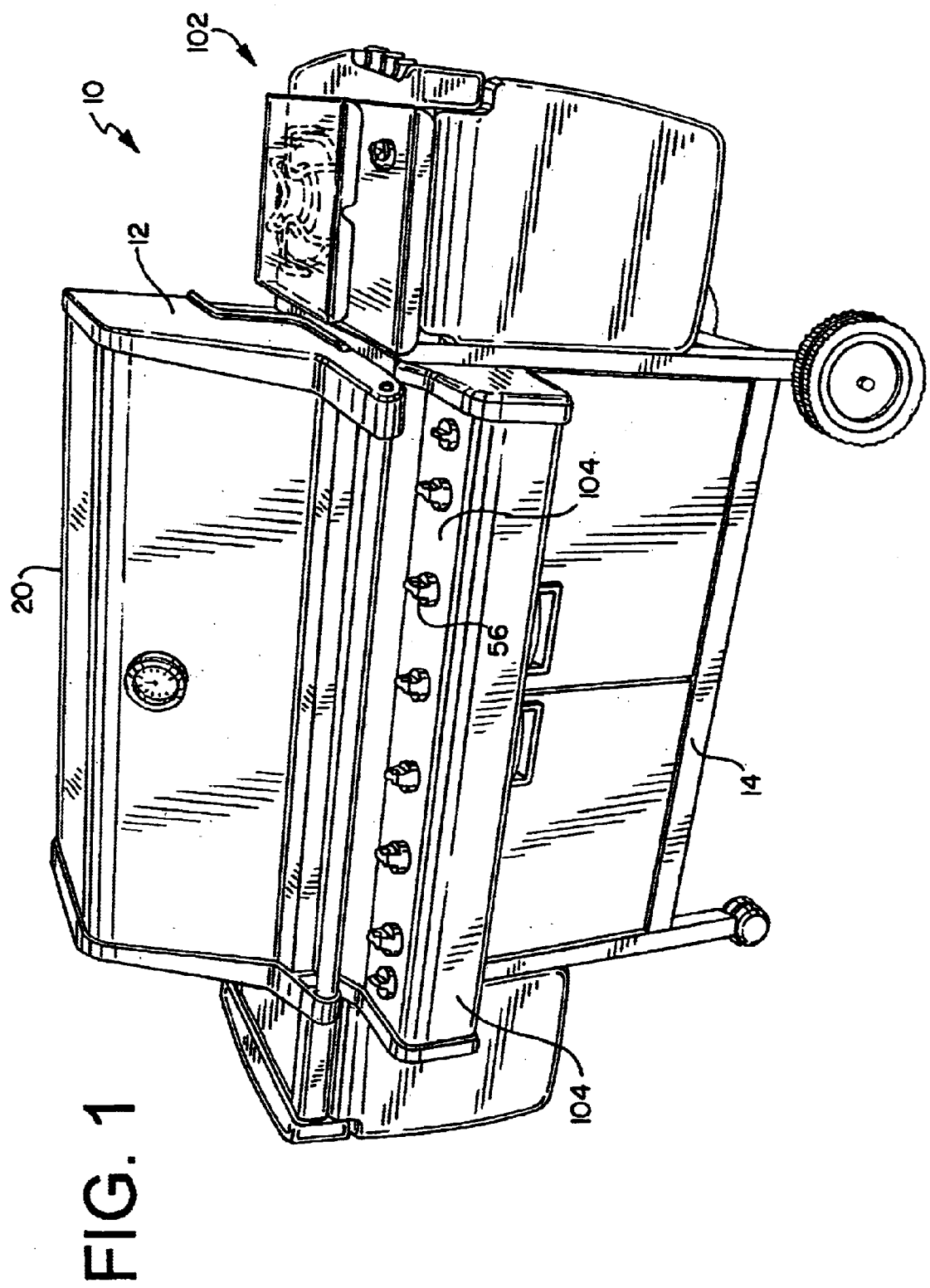
FIG. 1 is a perspective view of a gas barbecue grill having a removable burner assembly of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 5:
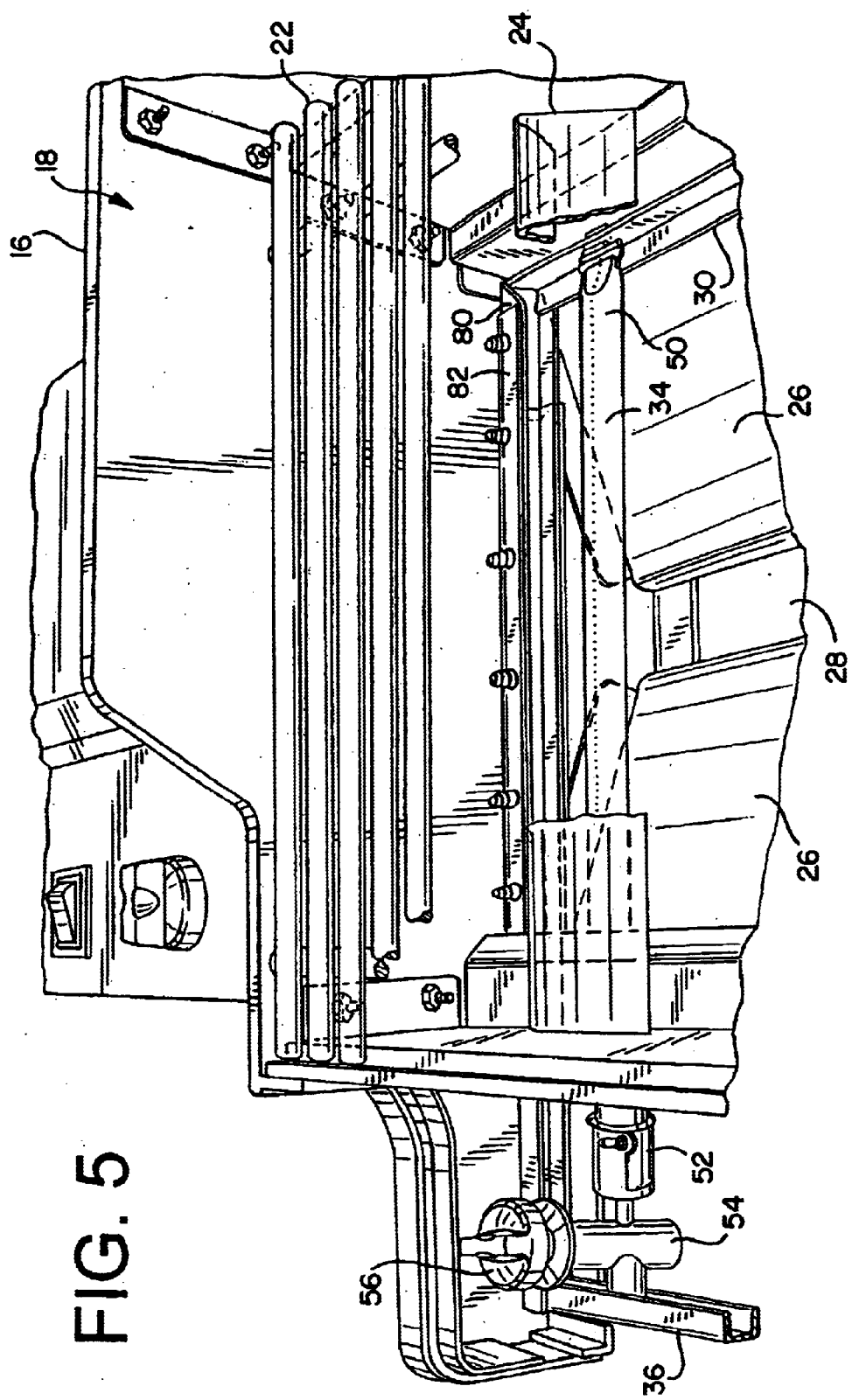
FIG. 5 is a partial perspective top view of the cooking chamber of the gas barbecue grill of FIG. 1.

Referring now in detail to the Figures, and initially to FIG. 1, there is shown a barbecue grill, generally designated by reference numeral 10, constructed in accordance with the teachings of the present invention. In the embodiment illustrated, the grill 10 comprises a cooking vessel 12 secured to a portable cart 14, however, any grill support structure 14, including a stationary support structure may be utilized. The cooking vessel 12 comprises a lower housing 16 and a cover or hood 20. The lower housing 16 defines a cooking chamber 18 (see FIG. 5). The cover 20 is secured to the grill 10 by a hinge so that the cooking chamber 18 of the lower housing 16 may be exposed. As shown in FIG. 5, a cooking grid 22 (illustrated partially cut away) is situated in the cooking chamber 18 of the lower housing 16. The cooking grid 22 typically rests on a ledge formed by the lower housing 16. Additionally, a plurality of sear bars 24 (illustrated partially cut away in FIG. 5) are also positioned in the cooking chamber 18 of the lower housing 16. The sear bars 24 are typically positioned between the cooking grid 22 and the removable burner assembly 30. In a preferred embodiment, the sear bars 24 are located above the openings of the burners 34. The sear bars 24 are located by another ledge formed by the lower housing 16. In the embodiment illustrated, the bottom 26 of the lower housing 16 is formed by opposed inclined walls 26. An opening 28 is located between the opposed inclined walls 26. Grease and other food drippings fall from the food on the cooking grid 22 and are incinerated by the sear bars 24. However, the grease and other food drippings that are not incinerated by the sear bars 24 falls through the burner assembly 30, contacts one of the inclined bottom walls 26 and then travels down through the opening 28 to a grease collection unit (not shown) at the base of the opening 29.

Figure 6:
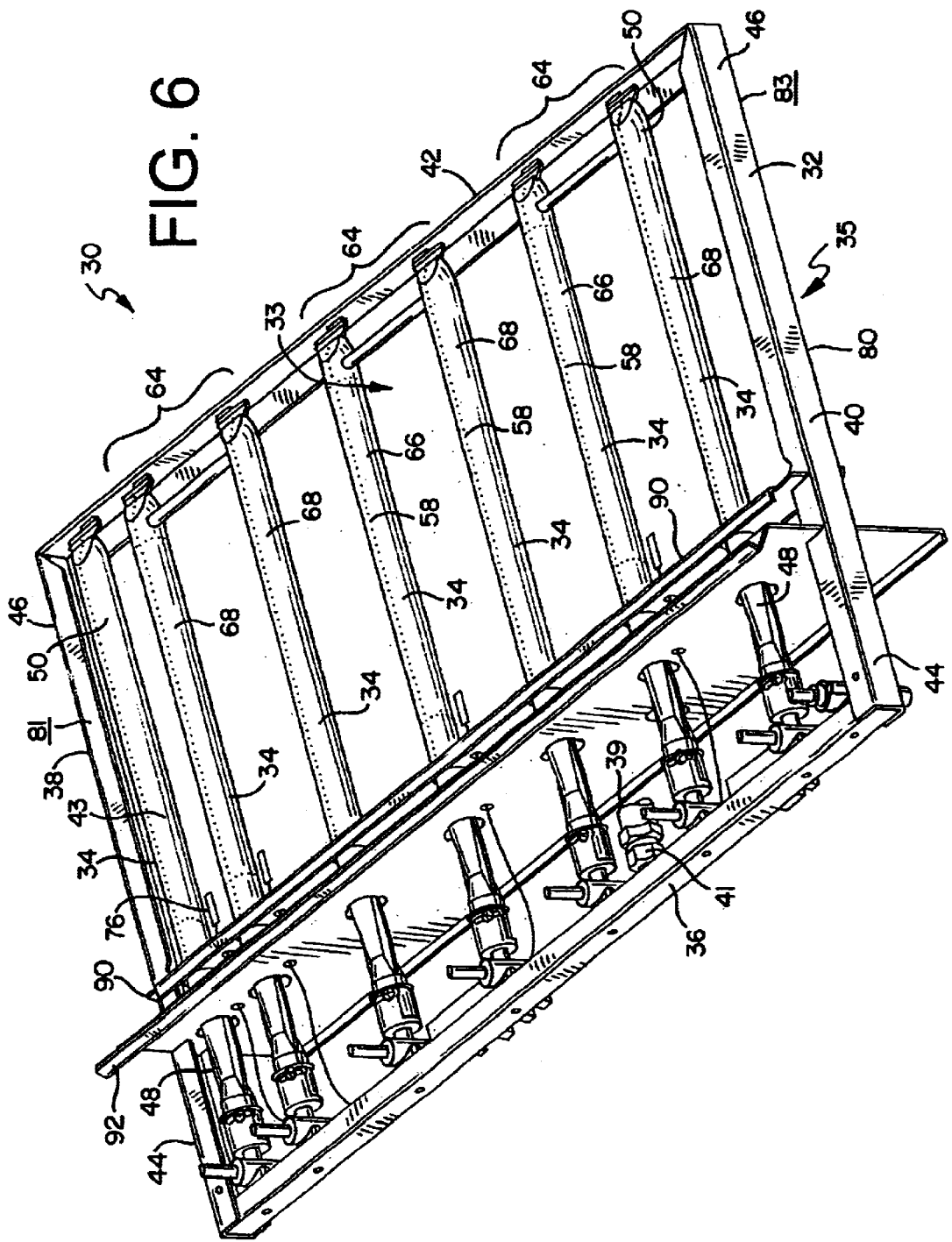
FIG. 6 is a perspective view of the removable burner assembly of the present invention.
Figure 7:
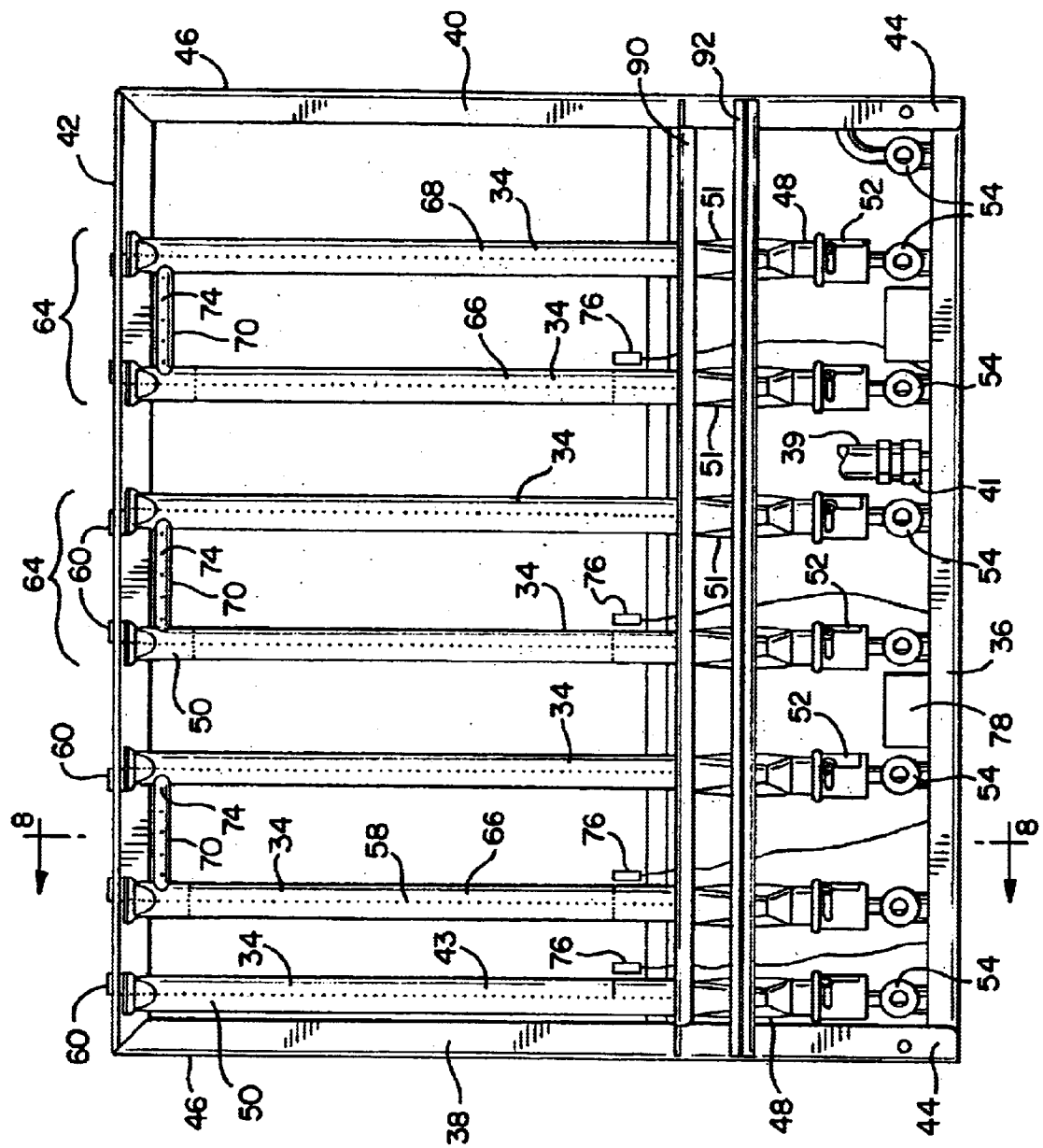
FIG. 7 is a top plan view of the removable burner assembly of the present invention.

The removable burner assembly 30 of the present invention is shown apart from the grill 10 in FIGS. 6 and 7. The burner assembly 30 generally has a burner frame 32, a burner 34, and a manifold 36. The burner frame 32 generally has an open bottom 33 and an open top 35. The open top 35 allows the flame from the burner 34 to heat the cooking chamber 18, including the sear bars 24, if provided, and cook the food on the cooking grid 22. In an alternate embodiment the open top 35 of the burner assembly 30 may include the sear bars 24 connected directly to the burner frame 32. While this provides a covering over the openings 58 in the burners 34 to prevent clogging of the burner openings 58, it still allows for an open top 33 embodiment. The open bottom 35 allows the grease and other food drippings to fall through the burner assembly 30 and reach the grease collection unit.

The burner frame 32 is configured of support members which define a perimeter of the burner frame 32. As shown in FIGS. 6 and 7, one embodiment of the burner frame 32 has a first side member 38, an opposing second side member 40, and a transverse member 42. The transverse member 42 connects the opposing side members 38,40. The transverse member 42 may be a rear member. The frame members 38,40,42 generally comprise 30 support members to support the burner 34. As shown in the figures, the frame members 38,40,42 are preferably made of a channel material such as steel or some other sufficiently rigid material capable of withstanding acceptable heat levels, however it is understood that numerous other material configurations are acceptable. The opposing side members 38,40 have a first end 44 and a second end 46. The second ends 46 of the opposing side members 38,40 are connected to the ends of the transverse member 42. Additionally, in a preferred embodiment, the first ends 44 of the opposing side members 38,40 are connected to the ends of the manifold 36. Thus, in this embodiment, the burner frame 32 has a perimeter defined by the support members comprising the manifold 36, the first side member 38, the second side member 40 and the transverse member 42. Further, as shown in FIGS. 6 and 8, the burner frame 32 is assembled in substantially the same plane.

The burner frame 32 may be increased or decreased in size, depending on the size of the grill 10 and the number of burners 34 required for the grill 10. In accordance with the burner frame 32 described above, the transverse member 42 and the manifold 36 each have a length, respectively. By inserting a manifold 36 with an increased length, and likely a correspondingly greater number of ports for attaching a greater number of burners, the size of the burner frame 32 may be increased for larger grills 10. Similarly, by inserting a manifold with a decreased length, and likely a correspondingly fewer number of ports for attaching a fewer number of burners, the size of the burner frame 32 may be decreased for smaller grills 10. When a larger or smaller size manifold 36 is utilized, a corresponding size transverse member 42 is also employed. As such, a modular removable burner assembly 30 for various size barbecue grills 10 is herein provided.

The manifold 36 is a member which is adapted to receive the fuel, typically from fuel tank, and to distribute the fuel to a number of burners 34. As shown in FIG. 6, a fuel line 39 having a connector 41 is connected to the manifold to distribute the fuel to the manifold 36. As explained below, the manifold 36 has a series of ports for connection to the various burners 34 to distribute the fuel thereto.

Generally, the burners 34 are connected to the burner frame 32. Further, in a preferred embodiment the burners 34 are positioned within the perimeter of the burner frame 32, and within the same plane in space of the burner frame 32. As further explained below, this configuration provides a removable burner assembly 30 that requires a minimum volume within the grill housing 16. In one preferred embodiment, the burners 34 have a first end 48 and a second end 50. Further, the burners 34 may have a tubular cross-sectional shape. In the preferred embodiment, the burners 34 extend from the front to the rear of the 30 burner assembly 30. As such, with ignition of various burners 34, different zones of heating within the cooking chamber 18 of the barbecue grill 10 can be accomplished. Notwithstanding the above configuration, the burners 34 may have any configuration, including H-shaped burners, square burners, etc., as well as any cross-sectional shape. The first end 48 of the burners 34 are connected in fluid communication to the manifold 36. Generally, the first end 48 of the burner 34 is adjacent a venturi configuration 51 (having a venturi and a venturi fin), an air shutter 52, and an opening (not shown). Opposing the venturi configuration 50, but still adjacent the first end 48 of the burner 34, is an opening that fluidly connects the burner 34 to a fluid control valve 54. The fluid control valve 54 is operated by a conventional control knob 56. The control valve 54 is then connected to the manifold 36 and controls the flow of fuel from the manifold 36 to the burner 34. As such, it can be said that the burner is 34 is connected to and in fluid communication with the manifold 36. Further, the manifold 36 is in fluid communication with a fuel supply. As explained later, this portion of the removable burner assembly 30 (i.e., the manifold 36, the first end 48 of the burners 34 and the first ends 44 of the opposing side members 38,40) is generally positioned outside the cooking chamber 18 when the burner assembly 30 is fully seated in the grill housing 16. The remaining portion of the burners 34, opposing side members 38,40, and the transverse member 42 are generally positioned within the cooking chamber 18 when the removable burner assembly 30 is fully seated in the grill housing 16. The second end 50 of the burners 34 are mounted to the transverse member 42 of the burner frame 32. As such, the burners 34 are located between the opposing side members 38,40 on the sides, and between the transverse member 42 and the manifold 36 on the ends 48,50. Further, it can be said that the burners 34 are substantially in the same plane as the burner frame 32.

The burners 34 have a plurality of small openings 58 which permit the fuel to emit from the burners 34. The openings 58 for each burner 34 preferably begin at a point proximate to where the burner 34 is positioned within the cooking chamber 18 when the removable burner assembly 30 is fully seated in the housing 16. The openings 58 continue substantially regularly toward and until the closed second end 50 of the burner 34.

Figure 11:
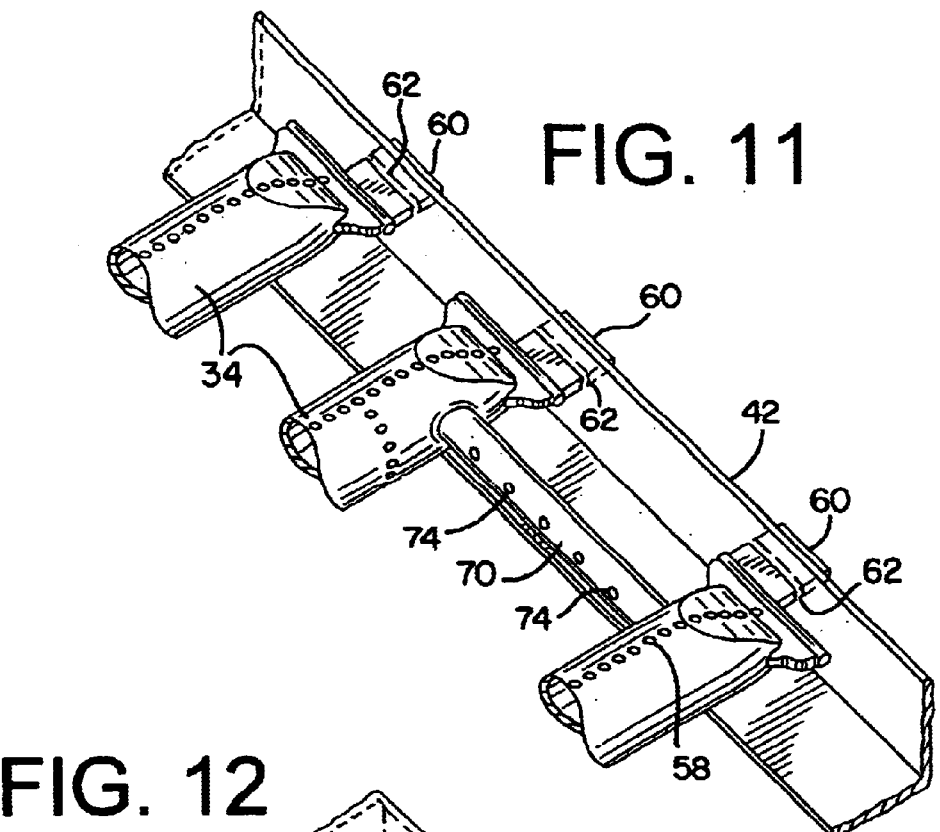
FIG. 11 is a partial perspective view of one embodiment of the cross-over assembly for the removable burner assembly of the present invention.
Figure 12:
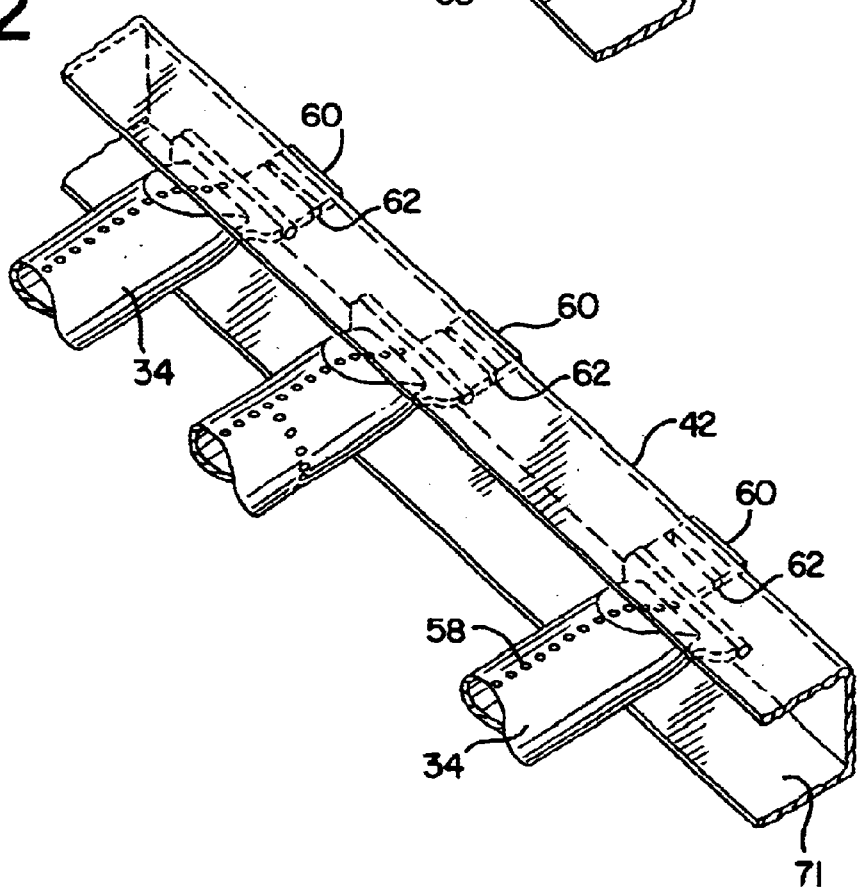
FIG. 12 is a partial perspective view of another embodiment of the cross-over assembly for the removable burner assembly of the present invention.

As shown in FIGS. 11–12, the closed second end 50 of the burners 34 may be pinched, capped or closed off by any other suitable means. The closed second end 50 ensures that a sufficient quantity and pressure of fuel is emitted form the openings 58 of each burner 34, accomplishing better heat distribution within the cooking chamber 18. Further, the closed end 50 of the burners 34 have a tab or key member 60 which mates with a mating slot 62 in the transverse member 42 of the burner frame 32. The key member 60 on the burner 34 is typically offset to one side of the burner 34. Additionally, as a safety measure, the slot 62 in the burner frame 32 is located such that when the burner assembly 30 is being assembled, the correct burner 34 will be properly assembled in the correct location on the manifold 36. This assures that the fuel will escape through the burner openings 58 at the proper orientation. This particular configuration prevents the burners 34 from being misattached to the burner frame 32 (i.e., backwards). It will be recognized by those skilled in the art that an indefinite number of different keyed or mating type configurations exist, and the present invention should be in no way limited to the disclosed configuration. The term "keyed" is meant to include any configuration which permits connection of the burner 34 to the burner frame 32 in only one way.

Additionally, when a plurality of burners 34 are utilized with the removable burner assembly 30, the manifold 36 is in fluid communication with the plurality of burners 34. Typically, a number of the plurality of burners 34 are joined as sets 64 of burners 34. In the preferred embodiment, the sets 64 of burners comprise two burners 34 paired together, however more than two burners 34 may be joined in a set 64. As shown in FIGS. 6 and 7, one of the plurality of burners in the set 64 is a primary burner 66, and another and different one of the plurality of burners in the set 64 is a secondary burner 68. Further, more than one secondary burner 68 may be in a burner set 64. For assembly purposes, the primary burner 66 has a key 60 extending in one direction from the closed end 50, and the secondary burner 68 has a key 60 extending in an opposite direction from the closed end 50 thereof.

Independent burners may also be utilized in conjunction with burner sets 64. As shown in FIGS. 6 and 7, an independent burner (identified as reference numeral 43) is utilized as the heat source for a smoker apparatus (not shown). Typically, the independent burner 43 operates similarly to a primary burner 66, however, the independent burner 43 is operated independently as opposed to having a secondary burner 68 in fluid communication therewith. As such, in the embodiment disclosed the independent burner 43 does not have an opening 72 for a flame cross-over member 70 as described below with the primary and secondary burners 66,68 in the burner set 64.

As shown in the figures, the primary and secondary burners 66,68 are fluidly connected with a flame cross-over member 70. The flame cross-over member 70 partially connects the flow of the fuel in the primary and secondary burners 66,68. In the preferred embodiment, the primary and secondary burners 66,68 have an opening 72 in the side thereof. The flame cross-over member 70 is inserted into the openings 72 in both the primary and secondary burners 66,68 to connect a fluid flow path therebetween. In such an embodiment, the flame cross-over member 70 is a smaller tube that may be open at either one or both ends. The ends of the cross-over member 70 are partially inserted into the openings 72 in the burners 66,68. The flame cross-over member 70 also has a plurality of openings or apertures 74 along its length. As shown in FIGS. 6 and 7, in a set 64 of burners 34, the cross-over member 70 extends from the primary burner 66 to the secondary burner 68 to provide an ignition path for igniting fuel emitted from the secondary burner 68.

In an alternate embodiment, partially shown in FIG. 12, a flash chamber 71 is illustrated. The flash chamber replaces the flame cross-over member 70. The flash chamber may be a fully enclosed member into which the burners communicate. The flash chamber connects each of the burners such that each burner can be independently ignited by the flash chamber. In this embodiment, since any burner 34 can be separately ignited, there is no need for sets of burners or for primary and secondary burners.

In use, the fluid control valve 54 on the primary burner 66 is opened, allowing fuel to fill the primary burner 66 and be emitted through the openings 58 in the primary burner 66. Some of the fuel, however, extends through the opening 72 in the burner 66, into the hollow portion of flame cross-over member 70, and out of the openings 74 in the cross-over member 70. In one embodiment the end of the cross-over member 70 that is inserted into the secondary burners 68 is capped. In an alternate embodiment, the end of the cross-over member 70 that is inserted into the secondary burners 68 may, however, be open to allow a supply of fuel to flow into the cross-over member from either the primary burner 66 or the secondary burner 68, depending on the pressures. The fuel being emitted from the primary burner 66 and the cross-over member 70 is ignited, providing a flame from the primary burner 66 and the cross-over member 70. Next, to ignite any of the secondary burners 68 that are in fluid communication with this primary burner 66, the control valve 54 for the secondary burner 68 is typically opened. When the control valve 54 for the secondary burner 68 is opened, fuel fills the secondary burner 68 and is emitted though the openings 58 in the secondary burner 68. The fuel emitted from the secondary burner 68, through the openings 58 in the secondary burner 68 that are located adjacent the flame cross-over member 70, is ignited from the flame from the flame cross-over member 70. As such, the ignited fuel emitting from the openings 74 in the flame cross-over member 70 operates as a pilot flame for the secondary burners 68. The flame path from the primary burner 66 and through the flame cross-over member 70 is known as a flame ignition path.

An ignitor 76 is utilized to initially ignite the fuel being emitted from the primary burner 66 of the gas burner assembly 30. As shown in FIGS. 6 and 7, the ignitor 76 is mounted to the burner frame 32. In the preferred embodiment, a separate ignitor 76 is positioned adjacent each of the primary burners 66 of the burner sets 64. Additionally, an ignitor 76 is also positioned adjacent the independent burner 43. As such, each of the burner sets 64 as well as the independent burners 43 may be separately ignited. Typically, the portion of the ignitor 76 that produces the spark is positioned adjacent one of the openings 58 in the burners 34. The ignitor 76 may be a mechanical ignitor or an electronic ignitor. In the preferred embodiment, the ignitor 76 is electronically operated. A single ignition switch (not shown) is utilized to operate all of the ignitors 76. When the ignition switch is depressed, an electrical charge is sent from an electronic ignition mechanism 78 to the ignitors 76. All of the primary 66 or independent 43 burners that are emitting fuel at the time the electrical charge is transferred will be then be lit.

Figure 3:
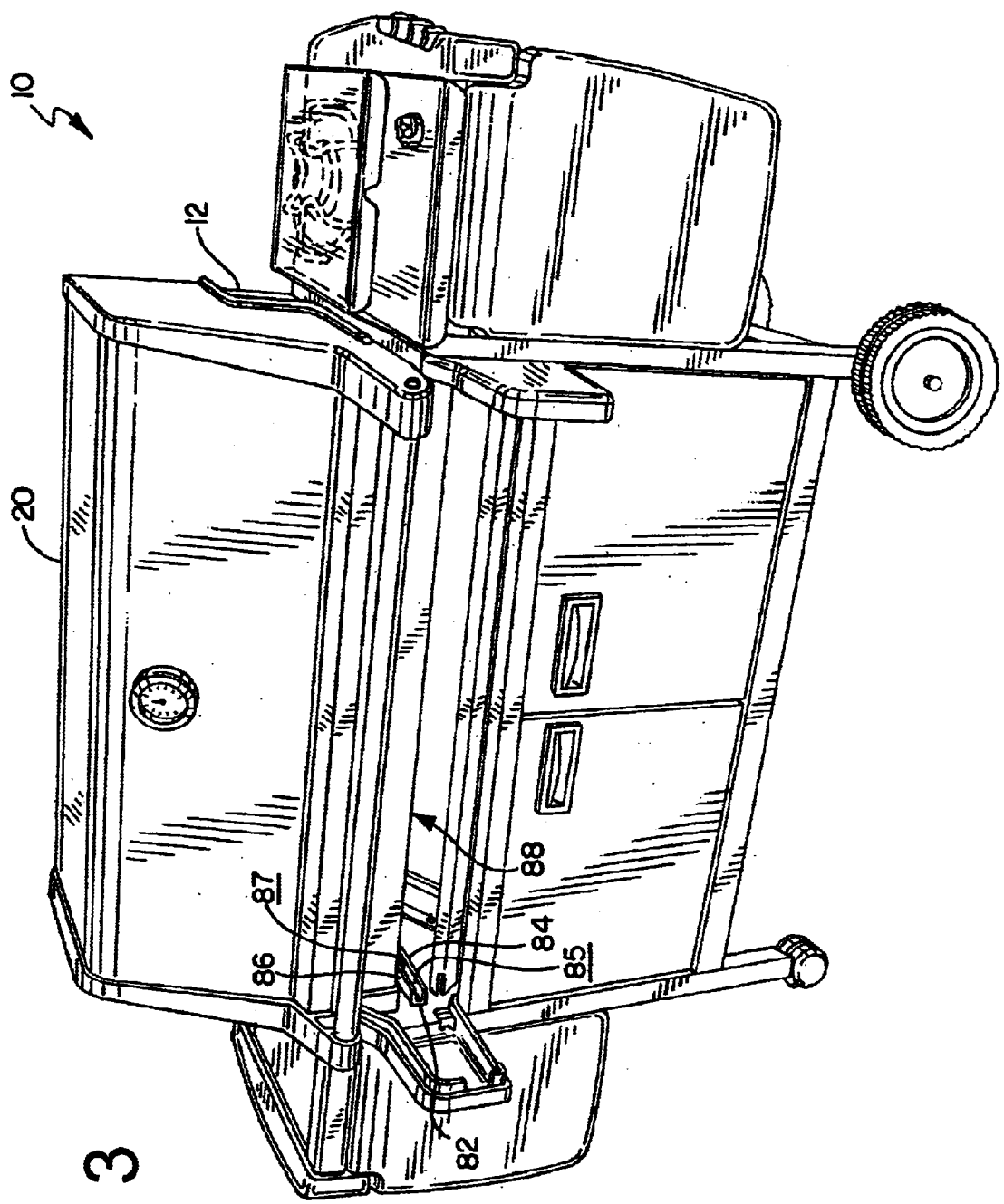
FIG. 3 is a perspective view of the gas barbecue grill of FIGS. 1 and 2, with the removable burner assembly of the present invention removed.
Figure 4:
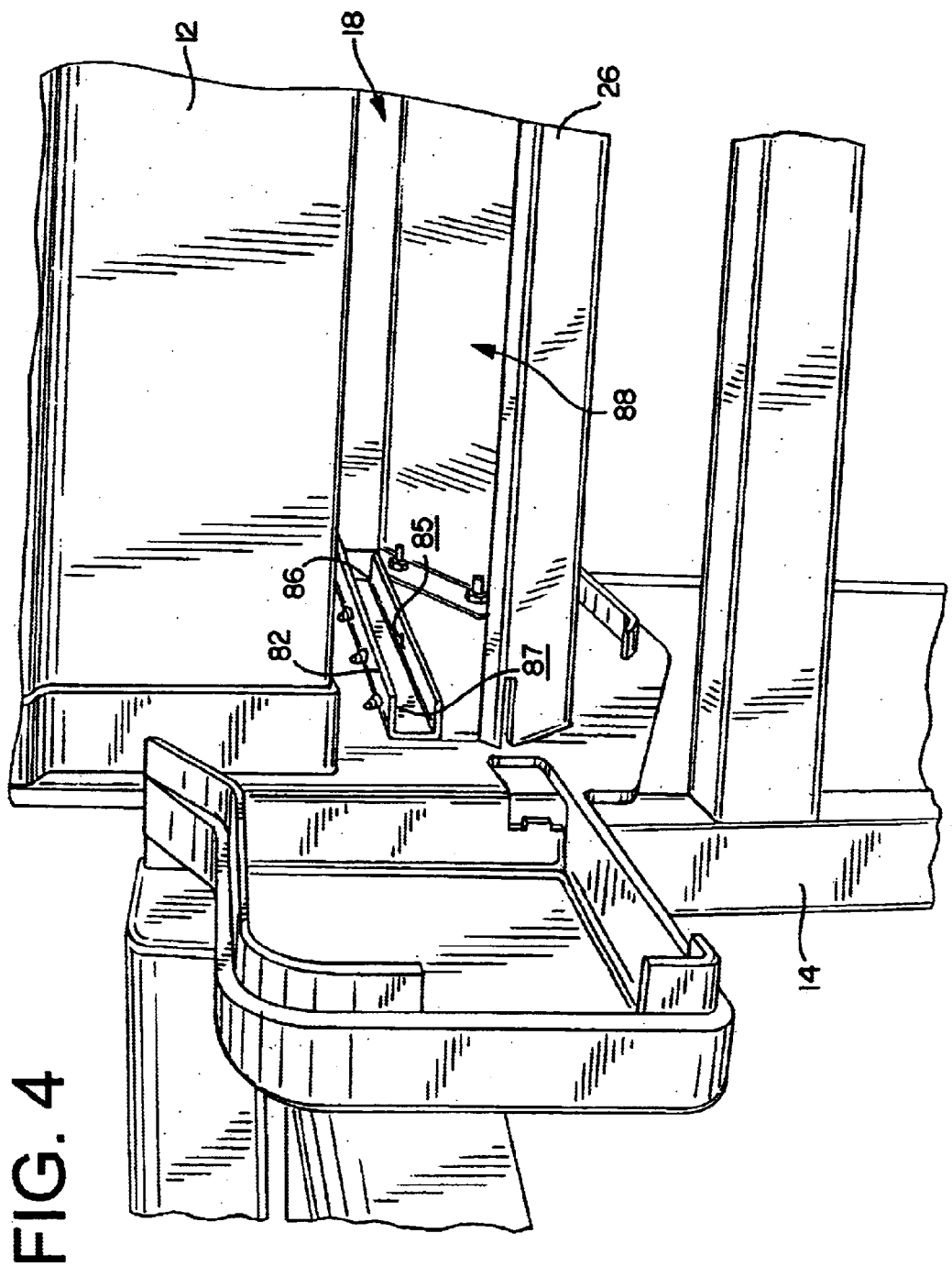
FIG. 4 is a partial perspective view of the gas barbecue grill of FIG. 3, with the removable burner assembly of the present invention removed.

The removable burner assembly 30, i.e., the burner frame 32 with the connected burners 34, is adapted to be removably mounted in the housing 16 of the grill 10. The burner assembly 30 has a first mating member 80, having first and second mating surfaces 81,83, that is adapted to mate with a second mating member 82 (also referred to as a support member) on the barbecue grill 10, having first and second support surfaces 85,87, to locate the burner assembly 30 within the cooking chamber 18 of the barbecue grill 10. One such second mating member 82 is shown in FIGS. 3-5. In this embodiment, the second mating member 82 comprises a channel depending from an interior of the housing 16 to support the removable burner assembly 30. The second mating member 82 may include a first support member 84 as a bottom support to support the weight of the removable burner assembly 30, and a second support member 86 as an upper support to assist in accurately locating the removable burner assembly 30 within the housing 16 and to prevent up and down movement of the removable burner assembly 30 within the grill housing 16. Typically, the first support member 84 has a first support surface 85 which engages the first mating surface 81, and the second support member 86 has a second support surface 87 which engages the second mating surface 83. In the preferred embodiment, the first and second support surfaces 85,87 are substantially horizontal. Alternatively, the second mating member 82 may only include a first support member 84 as a ledge, on which the burner frame 32 rests. The ledge may operate as a first support surface 85. The second mating member 82 may be a separate member that is mechanically secured to the housing 16, or it may be a component of the housing 16. In the preferred embodiment, the end caps of the housing 16 are cast members, and the second mating member 82 is cast as part of the end caps. Additionally, the second mating member 82 may be a post, bolt or other mechanical device which engages the burner assembly 30.

In one embodiment, the removable burner assembly 30 is dropped into place in the grill 10. Such an embodiment typically utilizes only a first support member 84. In another embodiment, the removable burner assembly 30 slidingly engages the housing 16 of the grill 10 for inserting and removing the burner assembly 30 from the barbecue grill 10. While this embodiment may also utilize only a first support member 84, the sliding embodiment typically utilizes a second mating member having first and second support members 84,86.

One means by which the removable burner assembly 30 may be inserted and removed from the grill 10 is by sliding the removable burner assembly 30 through an aperture 88 in the grill housing 16. FIG. 3 discloses a grill 10 having an aperture 88 in its lower housing 16 that allows for insertion and removable of the burner assembly 30. In FIG. 3, the entire grill 10 is substantially assembled, however, the burner assembly 30 is removed. FIG. 4 discloses a closer partial view of the grill aperture 88 of FIG. 3.

Prior to inserting the removable burner assembly 30 in the grill 10, the removable burner assembly 30 is fully assembled. In a preferred embodiment, such assembly includes connecting burners 34 to the burner frame 32. In this embodiment, the burner frame 32 is made of a bent and formed/welded channel member that comprises the opposing side members 38,40 and the transverse member 42. It is understood, however, that the burner frame 32 may be constructed of a variety of methods without departing from the scope of the invention. Further, in a preferred embodiment whereby the removable burner assembly 30 is inserted though an aperture 88 in the grill housing 16, the burner frame 32 has a second transverse member 90 or front frame member. The second transverse member 90 is illustrated in FIGS. 6–10. The second transverse member 90 engages the grill housing 16 to seal the aperture 88 and to prevent heat and flames from escaping through the aperture 88. In a preferred embodiment the second transverse member 90 has a first angled member 91 that engages the inclined walls of the bottom 26 of the housing. A second angled member 93 of the second transverse member 90 is positioned above the inclined wall 26 to provide that grease, water and other drippings are directed into the grease collection unit (not shown) at the base of the opening 28 in the bottom of the housing 16. A heat shield 92 may also be utilized, if necessary, to prevent excess heat from reaching the control panel.

Once the burner frame 32 is assembled, and after the burners 34 are connected to the manifold 36 with control valves 54, the burners 34 and the manifold 36 are mounted to the burner frame 32. The burners 34 are passed though openings 94 in the heat shield 92 and the second transverse member 90. The second end 50 of the burners 34 are then mounted to the transverse member 42 of the burner frame 32 as explained above. It is understood, however, that the burner assembly 30 may be manufactured by additional means without departing from the scope of the present invention. For example, the entire burner assembly 30, including the burner frame 32, the burners 34 and the manifold 36 may be manufactured of a pressed/formed sheet metal component.

Additionally, as explained above the manifold 36 of the burner assembly 30 has a connector 41 with a fuel line 39. At the end of the fuel line 39 is an interface plate 96 and another connector 98. In a preferred embodiment, the fuel line 39, interface plate 96 and connector 98 are components of the removable burner assembly 30. As such, the subassembly of the burner assembly 30 requires no additional components (other than a few minor hardware items such as locating pins, and/or screws and nuts) for connection with the grill 10. The fuel line 39, connector 41 and interface plate 96 are best illustrated in FIGS. 13 and 14.

After the burners 34 and manifold 36 have been assembled on the burner assembly 30, the ignitors 76 are mounted to the burner frame 32. Typically, the ignitors 76 are secured to the interior face of the second transverse member 90 such that the portion of the ignitor 76 that produces the spark is positioned adjacent one of the openings 58 in the burners 34.

Figure 2:
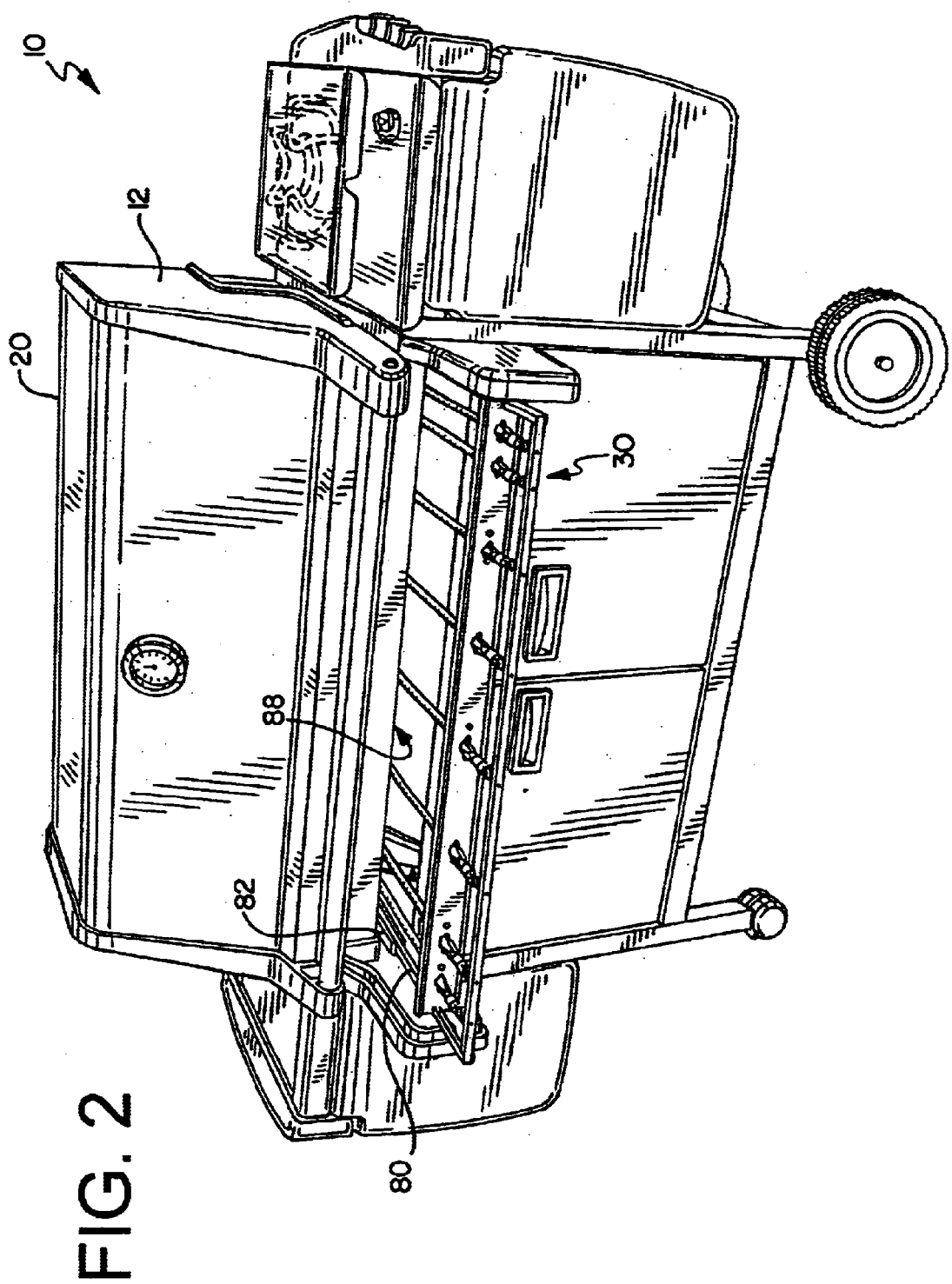
FIG. 2 is a perspective view of the gas barbecue grill and removable burner assembly of FIG. 1, with the control panel removed and the removable burner assembly of the present invention partially removed.

In a preferred embodiment, the burner assembly 30 is slidingly inserted in the grill housing 16 by first inserting the transverse member 42 of the burner frame 32 into the grill 10 through the aperture 88. At that point, the first mating member 80 of the burner assembly 30 slidingly engages the second mating member 82 of the grill 10. The first mating member 80 of the burner assembly 30 may include the opposing side members 38,40, or portions thereof. Further, the second mating member 82 may include a ledge of the grill housing 16. FIG. 2 discloses the burner assembly 30 partially inserted into the grill and engaging the mating members 82 of the grill. By inserting the burner assembly 30 further into the grill 10 the burner assembly will be fully seated in position as shown in FIGS. 5 and 13. At the location where the burner assembly 30 is fully seated, the second transverse member 90 engages the grill housing 16 to seal the aperture 88.

Figure 13:
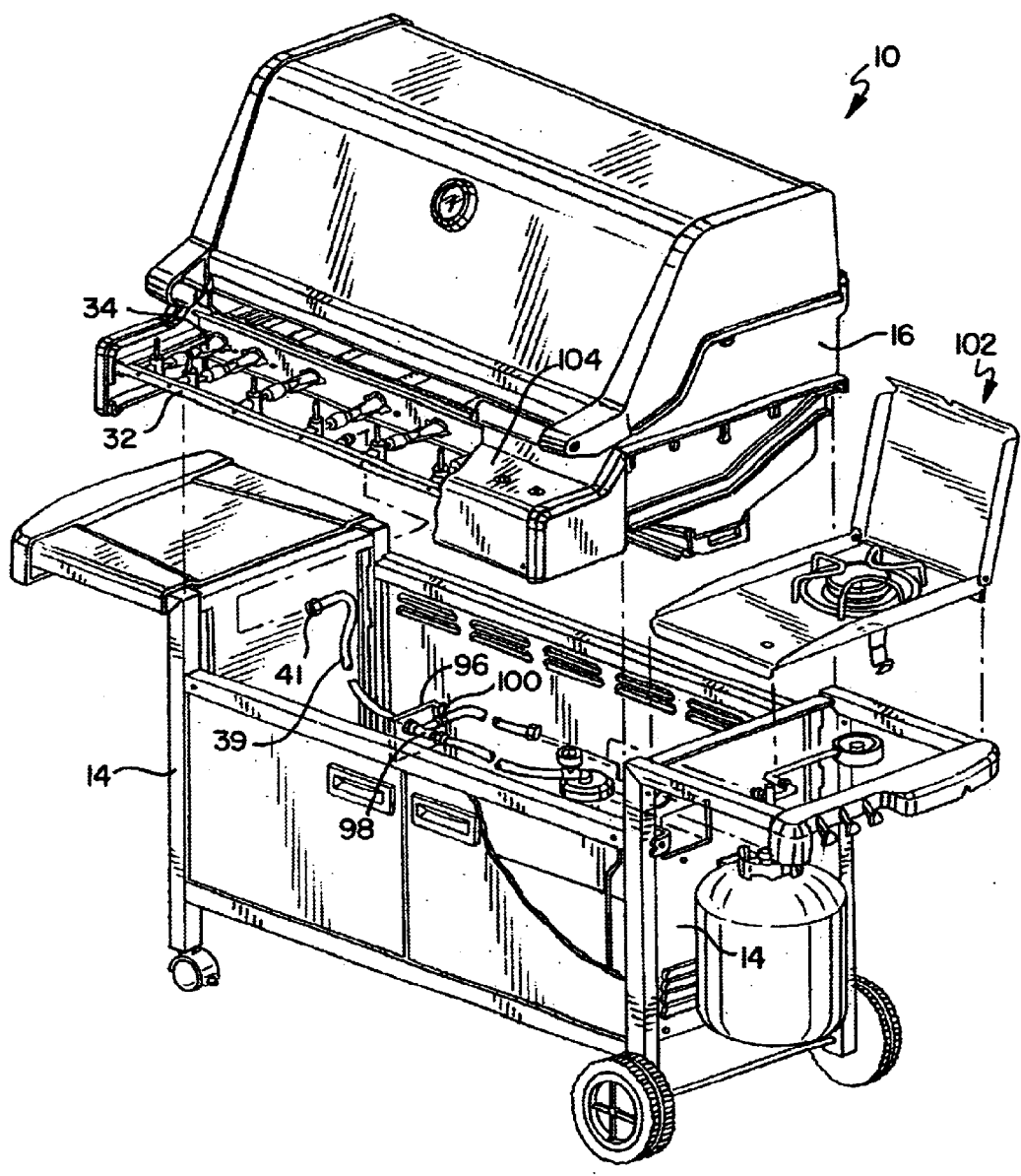
FIG. 13 is an exploded perspective view of the gas barbecue grill and removable burner assembly of FIG. 2; and, FIG. 14 is a side elevation view of the fuel lines for the side burner assembly of the gas barbecue grill and removable burner assembly of the present invention.
Figure 14:
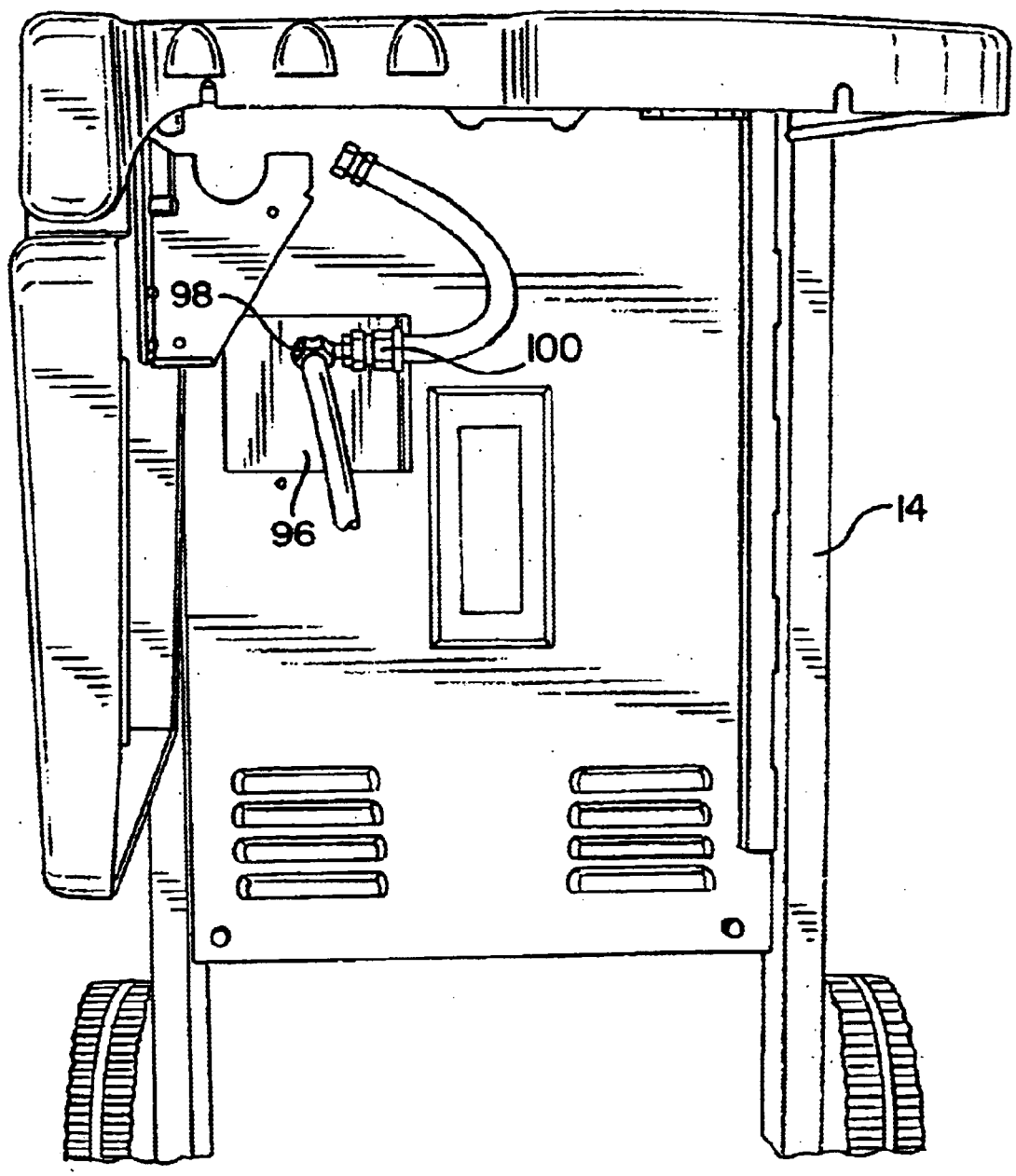

As shown in FIGS. 13 and 14, after the burner assembly 30 is fully seated in the grill the interface plate 96 can be connected to the support structure 14 of the grill 10. Finally, a fuel line extending from the fuel supply can be connected to the fuel connector 98 on the interface plate 96 to place the burner assembly 30 in fluid communication with the fuel supply.

The connector 98 may include a separate output 100 for connection to an auxiliary burner or side burner assembly 102. In a preferred embodiment, the separate output 100 has a quick-release connection for easily connecting the side burner assembly 102.

As shown in FIGS. 5 and 13, when the burner assembly 30 is fully seated in the grill 10, a portion of the burner assembly 30 extends outside of the cooking chamber 18 when the burner assembly 30 is fully seated in the grill housing 16. Specifically, the manifold 36, the first end 48 of the burners 34, the first ends 44 of the opposing side members 38,40, and the control valves 54 are generally positioned outside the cooking chamber 18 in the fully seated position. The remaining portion of the burners 34, opposing side members 38,40, and the transverse member 42 are generally positioned within the cooking chamber 18 when the removable burner assembly 30 is fully seated. Finally, when the burner assembly 30 is fully seated it is fixed in place with a easily removable locating pin (not shown).

After the burner assembly 30 is secured the control panel 104 (shown in FIGS. 1 and 13) may be assembled over the burner assembly 30. A portion of the control valves 54 extend above the control panel 104 to allow a control knob to be attached thereto for adjustment of the control valves 54.

Because the removable burner assembly 30 is itself a complete unit, the assembly 30 may be separately manufactured and assembled from the grill 10. Additionally, the removable burner assembly 30 may be separately serviced, repaired and cleaned.

To remove the burner assembly 30 the control knobs 56 are removed and then control panel 104 is removed. Additionally, the fuel line from the fuel supply to the connector 98 on the interface plate 96 is disconnected and the interface plate 96 is separated from the support structure 14. Once the gas line has been disconnected, the burner assembly 30 is slid out of the grill housing 16 and separated from the grill 10.

After the burner assembly 30 is removed from the grill 10, the burner assembly can be serviced, including cleaning the burner assembly and/or repairing or replacing the various components of the burner assembly. Finally, the burner assembly 30 can be re-inserted into the grill housing 16.

As an alternate means, a burner 34 may be removed from the assembly 30 without entirely removing the assembly 30 from the grill 10. In this scenario, the control panel 104 is removed and then the manifold 36 is disconnected from the opposing side members of the burner frame 32. The manifold 36 and connected burners 34 can then be slid out from the burner frame 32 and any of the burners 34 can be disconnected from the manifold 36. The disconnected burner 34 can then be serviced or replaced as required, and the new burner 34 connected to the burner frame 32. Finally, the burners 34 and manifold 36 are repositioned with the burner frame 32 such that the tabs 60 are inserted in the slots 62, and the manifold 36 is again connected to the burner frame 32. Additionally, other components of the burner assembly 30 may be serviced without completely removing the assembly 30 from the grill 10. With this alternate means of servicing the burner assembly 30 it is not necessary to break any gas line connections.

While the specific embodiments have been illustrated and described, numerous modifications come to mind without significantly departing from the spirit of the invention, and the scope of protection is only limited by the scope of the accompanying Claims.

We claim:

1. A removable burner assembly for a gas barbecue grill, the grill having a housing connected to a grill support assembly, the burner assembly comprising:
   a burner frame having an open bottom and an open top, a burner connected to the burner frame, and a manifold in fluid communication with the burner, wherein the burner frame, with the connected burner, is adapted to be removably mounted in the housing of the grill, wherein the burner frame has a transverse member connecting opposing side members, the burner being located between the opposing side members, and wherein the manifold has a first end and a second end, the first end of the manifold being secured to a first of the opposing side members and the second end of the manifold being secured to a second of the opposing side members.

2. A removable burner assembly for a gas barbecue grill, the grill having a cooking chamber supported by a grill support assembly, and a fuel supply, the burner assembly comprising:
   a plurality of burners:
   a manifold in fluid communication with the plurality of burners, and adapted to be connected in fluid communication with the fuel supply; and,
   a burner frame having a first side member, an opposed second side member, and a transverse member connecting the first and second side members, the first and second side members defining a perimeter of the burner frame, and the plurality of burners being located within the perimeter of the burner frame, wherein the burner frame has a first mating member adapted to mate with a second mating member of the barbecue grill to locate the burner frame within the cooking chamber of the barbecue grill, wherein the burner assembly is adapted to be inserted and removed from the cooking chamber of the barbecue grill, and wherein the manifold is connected to the first and second side members.

3. A removable burner assembly for a gas barbecue grill, the grill having a cooking chamber supported by a grill support assembly, and a fuel supply, the burner assembly comprising:
   a plurality of burners;
   a manifold in fluid communication with the plurality of burners, and adapted to be connected in fluid communication with the fuel supply; and,
   a burner frame having a first side member, an opposed second side member, and a transverse member connecting the first and second side members, the first and second side members defining a perimeter of the burner frame, and the plurality of burners being located within the perimeter of the burner frame, wherein the burner frame has a first mating member adapted to mate with a second mating member of the barbecue grill to locate the burner frame within the cooking chamber of the barbecue grill, wherein the burner assembly is adapted to be inserted and removed from the cooking chamber of the barbecue grill, and wherein the second mating member is in the cooking chamber, and the opposed side members of the burner frame are adapted to engage the second mating member to locate the burner frame within the cooking chamber of the barbecue grill.

4. The burner assembly of claim 3, wherein the first mating members of the burner frame are adapted to slidingly engage the second mating members of the barbecue grill.

5. The burner assembly of claim 4, wherein the second mating members comprise a ledge adapted to slidingly support the first mating members of the burner frame.

6. A removable burner assembly for a gas barbecue grill, the grill having a housing connected to a grill support assembly, the burner assembly comprising:
a burner frame substantially defining a boundary of the removable burner assembly, a plurality of burners connected to the burner frame, and a manifold in fluid communication with the burners, wherein the burner frame, with the connected burners, is adapted to be removably mounted in the housing of the grill, and wherein a portion of the boundary of the burner frame is defined by opposed first and second side members, and a rear member, and wherein the manifold is connected at a first end to the first side member and at a second end to the second side member.

7. A removable burner assembly for a gas barbecue grill, the grill having a housing connected to a grill support assembly, the burner assembly comprising:
a burner frame substantially defining a boundary of the removable burner assembly, a plurality of burners connected to the burner frame, and a manifold in fluid communication with the burners, wherein the burner frame, with the connected burners, is adapted to be removably mounted in the housing of the grill, wherein one of the plurality of burners is adjacent a smoker assembly, and wherein the one of the plurality of burners has a separate ignitor to independently ignite the one of the plurality of burners.

8. A modular removable burner assembly for a gas barbecue grill, the grill having a housing connected to a grill support assembly, the burner assembly comprising:
an open bottom burner frame having opposing first and second side members, a plurality of burners connected to the burner frame, and a manifold connecting the burners in fluid communication, wherein the manifold is connected to the opposing side members of the burner frame, and wherein a portion of the burner frame is adapted to engage a mating member on an inside of the grill housing for concurrently seating and removing the burner frame and the plurality of burners connected thereto.

9. The removable burner assembly of claim 8, further comprising a front frame member connecting the first and second side members, the front frame member located between the manifold and a rear member of the burner frame.

10. The removable burner assembly of claim 9, wherein the front frame member is adapted to engage the housing of the grill when the burner assembly is fully seated in the grill.

11. The removable burner assembly of claim 8, further comprising a flame cross-over member connecting in fluid communication at least two of the plurality of burners in a burner set, the flame cross-over member being located distal the manifold.

12. The removably burner assembly of claim 11, further comprising an ignitor adjacent one of the plurality of burners that is connected in fluid communication with another of the plurality of burners in the burner set.

13. The removable burner assembly of claim 11, further comprising at least two burner sets connected to the burner frame, each burner set having at least two burners in fluid communication though a flame cross-over member, each burner set further having an ignitor adjacent one of the burners of the burner set.

14. The removable burner assembly of claim 11, wherein an additional one of the plurality of burners is adjacent a smoker assembly in the grill housing, and wherein the one of the plurality of burners has a separate ignitor to independently ignite the one of the plurality of burners.

15. A modular removable burner assembly for a gas barbecue grill, the grill having a housing connected to a grill support assembly, the burner assembly comprising:
an open bottom burner frame, a plurality of burners connected to the burner frame, and a manifold connecting the burners in fluid communication, wherein a portion of the burner frame is adapted to engage a mating member on an inside of the grill housing for concurrently seating and removing the burner frame and the plurality of burners connected thereto, wherein the burner frame has opposing first and second side members and a rear member connecting the first and second side members, and wherein the rear member of the burner frame and the manifold have a length, respectively, and wherein the rear member and the manifold are exchangeable with an extended rear member and manifold, respectively, to accommodate a greater number of burners for the burner assembly.

16. A removable burner assembly and barbecue grill, comprising:
a barbecue grill having a housing with a cooking chamber, the housing having a support member depending from an interior thereof, the housing further having a bottom wall, and a hood enclosing a top of the cooking chamber, the barbecue grill supported by a support assembly; and,
a removable gas burner assembly, the assembly having a burner frame having an open top and an open bottom, a burner connected to the burner frame, and a manifold in fluid communication with the burner, the burner frame further having a mating portion removably engaging the support member to support the removable gas burner assembly within the housing of the barbecue grill.

17. The removable burner assembly and barbecue grill of claim 16, wherein the housing has an aperture through a wall thereof, and wherein the removable gas burner assembly slidingly engages the support member of the housing through the aperture.

18. The removable burner assembly and barbecue grill of claim 16, wherein the removable gas burner assembly further comprises a control valve adjacent the manifold and the burner to control the flow of fuel from the manifold to the burner.

19. The removable burner assembly and barbecue grill of claim 17, wherein a portion of the burner frame assembly extends outside of the cooking chamber.

20. The removable burner assembly and barbecue grill of claim 16, wherein the removable gas burner assembly further comprises an ignitor located adjacent an outlet of the burner.

21. The removable burner assembly and barbecue grill of claim 16, wherein the burner frame has a first side member, an opposed second side member, and a first transverse member connecting the first and second side members.

22. The removable burner assembly and barbecue grill of claim 21, wherein the burner frame has a first mating member adapted to mate with a second mating member of the barbecue grill to locate the burner frame within the cooking chamber of the barbecue grill, and wherein the burner assembly is adapted to be inserted and removed from the cooking chamber of the barbecue grill.

23. The removable burner assembly and barbecue grill of claim 21, wherein the opposing side members of the burner frame slidingly engage a ledge of the grill housing.

24. The removable burner assembly and barbecue grill of claim 21, wherein the manifold is connected to the first and second side members.

25. The removable burner assembly and barbecue grill of claim 21, wherein portions of the first and second side members of the burner frame comprise the first mating member.

26. The removable burner assembly and barbecue grill of claim 16, wherein the removable burner assembly has a plurality of burners connected to the burner frame.

27. The removable burner assembly and barbecue grill of claim 26, further comprising a flame cross-over member between a primary burner of the plurality of burners and a secondary burner of the plurality of burners, the flame cross-over member providing ignition for fuel in the secondary burner.

28. The removable burner assembly and barbecue grill of claim 27, wherein the flame cross-over member is a tube in fluid communication with the primary burner and the secondary burner, the tube having a plurality of apertures therethrough.

29. The removable burner assembly and barbecue grill of claim 27, wherein the flame cross-over member is a flash chamber fluidly joining the primary burner and the secondary burner.

30. The removable burner assembly and barbecue grill of claim 26, wherein at least one of the plurality of burners is a primary burner, and wherein at least a different one of the plurality of burners is a secondary burner, and further comprising an ignitor adjacent the primary burner, a first control valve adjacent the primary burner, and a second control valve adjacent the secondary burner, the first and second control valves independently controlling the flow of fuel through the primary and secondary burners, respectively.

31. The removable burner assembly and barbecue grill of claim 30, further comprising an ignitor adjacent the primary burner.

32. The removable burner assembly and barbecue grill of claim 26, wherein the plurality of burners comprise a plurality of sets of burners, each set of burners having a primary burner, a secondary burner, and a flame cross-over member fluidly connecting the primary burner and the secondary burner, and wherein each of the plurality of sets of burners are located within a boundary of the burner frame.

33. The removable burner assembly and barbecue grill of claim 32, further comprising an ignitor adjacent each primary burner.

34. The removable burner assembly and barbecue grill of claim 26, wherein the plurality of burners further comprise an independent primary burner, the independent primary burner being located within the boundary of the burner frame and adjacent one of the sets of burners.

35. The removable burner assembly and barbecue grill of claim 26, wherein the support member of the grill housing is a ledge to support the mating portion of the burner frame.

36. The removable burner assembly and barbecue grill of claim 21, wherein the housing has an aperture through a wall thereof, wherein the removable gas burner assembly slidingly engages the support member of the housing through the aperture, and wherein the burner frame has a second transverse member that engages the aperture in the housing to close the aperture.

37. The removable burner assembly and barbecue grill of claim 36, wherein the second transverse member is positioned on the burner frame between the manifold and the first transverse member.

38. The removable burner assembly and barbecue grill of claim 16, wherein the removable burner assembly has a fuel line having a first end and a second end, the first end of the fuel line connected to the manifold and the second end of the fuel line connected to a connector, the connector mounted to a interface member that removably engages the barbecue grill support assembly.

* * * * *